Patented Sept. 20, 1927.

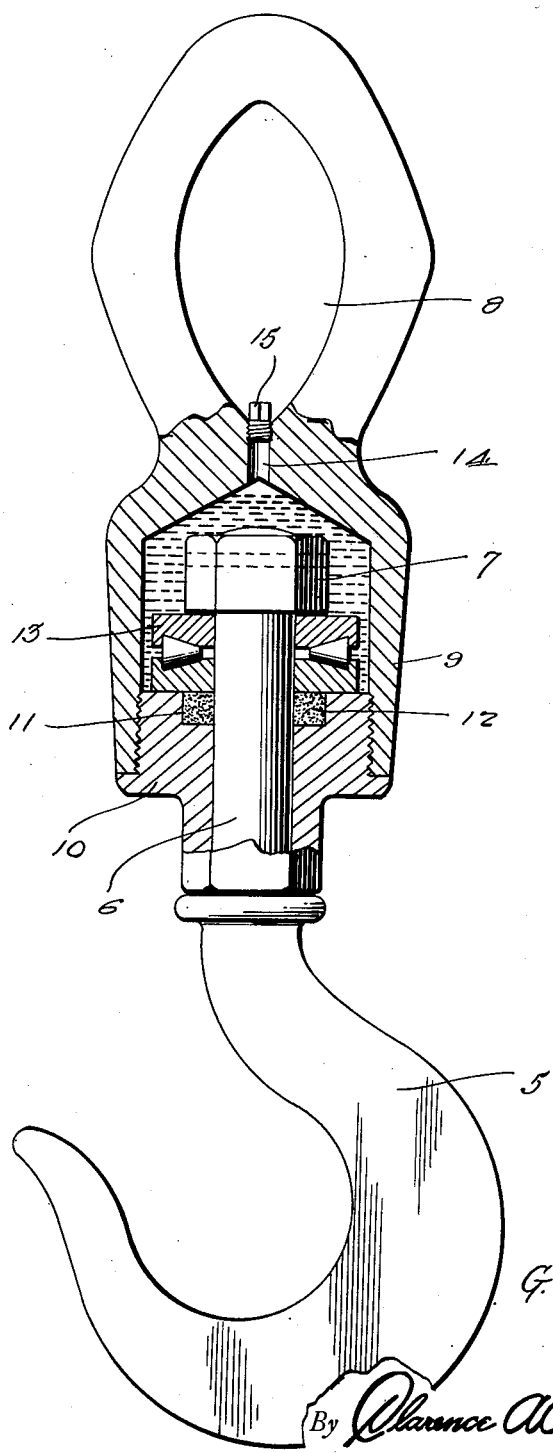

1,642,958

UNITED STATES PATENT OFFICE.

GEORGE FRANK JOYNER, OF MONTPELIER, MISSISSIPPI, ASSIGNOR OF ONE-HALF TO LEROY McDOWELL MOSELEY, OF MONTPELIER, MISSISSIPPI.

SWIVEL HOOK.

Application filed December 17, 1926. Serial No. 155,448.

This invention relates to new and useful improvements in swivel hooks, and has for its primary object to provide a hook of this character wherein the swivel connection between the hook unit and the suspending unit may be permanently maintained within an oil bath so as to prolong the life of the hook and to permit the loose swiveling of the hook member with respect to the body.

A further and important object is to provide a hook of this character that is extremely simple of construction, inexpensive of manufacture, and one wherein the parts may be readily disassembled for cleaning, repair, or renewal purposes.

With the foregoing and other objects in view as the nature of the invention will be better understood, the same comprises the novel form, combination, and arrangement of parts hereinafter more fully described, shown in the accompanying drawing and claimed.

In the drawing:—

The figure is a view partly in elevation and partly in longitudinal cross section of a swivel hook constructed in accordance with the present invention.

Now having particular reference to the drawing, my novel invention consists of a hook unit 5 provided with the usual elongated circular shank 6 that is threaded at its upper end for the reception of a retaining nut 7.

The present hook further includes a bail 8 formed at its lower end with a cylindrical oil chamber 9 open at its lower end and internally threaded for receiving a body nut 10 formed centrally with a vertical bore through which the shank 6 of the hook unit 5 passes, the inner face of this body nut being formed with a circular socket 11 concentric with the bore for receiving a suitable packing 12. Disposed around the shank 6 of the hook member beneath the retaining nut 7 is a conventional bearing unit 13 for the purpose of permitting the free rotation of the hook shank 6 within the body nut 10.

The cylindrical oil chamber 9 is formed at its top side with an inlet opening 14 that opens at its upper end within the bail 8 and that is formed internally at said end with threads for receiving a threaded closure plug 15.

It will thus be seen that I have provided a highly novel, simple, and efficient swivel hook that is well adapted for all the purposes heretofore designated, even though I have herein shown and described the invention as consisting of certain detail structural elements, it is nevertheless to be understood that minor changes may be made therein without affecting the spirit and scope of the appended claim.

Having thus described the invention, what I claim is:—

In a swivel hook of the class described, a hanging bail, an oil chamber formed on the lower end of the bail, the lower end of the oil chamber being open and internally threaded, a body nut threaded into the open lower end of the oil chamber and provided with a central smooth bore, a hook member having a circular shank extending upwardly through the bore of the body nut, the upper face of the body nut being provided with a circular socket concentric with the bore, a packing in the socket and engaging the shank of the hook, a bearing unit disposed around the upper end portion of the shank adjacent the upper face of the body nut, a nut threaded on the upper threaded end of the shank and engaging the top of the bearing unit whereby the hook member is secured to the bail, the top of the oil chamber being provided with an oil inlet opening, and a plug normally closing the same.

In testimony whereof I affix my signature.

GEORGE FRANK JOYNER.